United States Patent [19]

Yoshizawa et al.

[11] 4,112,798
[45] Sep. 12, 1978

[54] DRUM TYPE FLYING SHEAR

[75] Inventors: Isamu Yoshizawa; Hiroyuki Okubo, both of Yokohama; Hiroshi Isozaki, Zushi; Tsutomu Hara; Bunpei Masuda, both of Yokohama, all of Japan

[73] Assignee: Ishikawajima-Harima Jukogyo Kabushiki Kaisha, Ote, Japan

[21] Appl. No.: 791,050

[22] Filed: Apr. 26, 1977

[30] Foreign Application Priority Data

Apr. 28, 1976 [JP] Japan .................................. 51/49588

[51] Int. Cl.² .......................................... B23D 25/12
[52] U.S. Cl. ............................... 83/344; 83/337; 83/345
[58] Field of Search ................. 83/344, 337, 345, 347, 83/343, 370

[56] References Cited

U.S. PATENT DOCUMENTS

| 1,910,387 | 5/1933 | Hahn | 83/344 |
| 2,288,922 | 7/1942 | Rosenleaf et al. | 83/344 |
| 2,951,410 | 9/1960 | Brown | 83/344 |
| 3,469,477 | 9/1969 | Welch et al. | 83/344 |
| 3,847,047 | 11/1974 | Jackson | 83/344 |

*Primary Examiner*—Donald R. Schran
*Attorney, Agent, or Firm*—Scrivener, Parker, Scrivener & Clarke

[57] ABSTRACT

Both of the upper and lower blades carried by the upper and lower drums, respectively, or either of the upper or lower blade is so arranged as to partially describe a non-circular locus having the vertically extended major axis when complete shearing is effected.

2 Claims, 5 Drawing Figures

DRUM TYPE FLYING SHEAR

DETAILED DESCRIPTION OF THE INVENTION

In the hot rolling lines, a hot strip rolled by a rough rolling mill is sheared by a drum type flying shear to remove a fish tail at each of the leading and trailing ends prior to the feeding of the hot strip to a finishing rolling mill.

Each of the upper and lower blades of the prior art drum type flying shears describes a circular locus so that the degree of lapping between the upper and lower blades must be increased in order to effect complete shearing. However, with increase in lapping, a gap or clearance between them must be inevitably increased. When the degree of lapping is increased in order to effect complete shearing of a crop from a hot strip, needle-shaped burrs are left over the hot strip. That is, as shown in FIG. 5 when a hot strip S is sheared by an upper blade $a$ and a lower blade $b$, a sheared burr $c$ is formed on the hot strip S and is ironed or rolled again by the upper and lower blades $a$ and $b$ to become a needle-shaped burr $d$. When the hot strip with needle-shaped burrs $d$ enters the work rolls of a finishing rolling mill, they are forced to remove from the hot strip S and adhere to the work rolls. As a result the surfaces of the hot strip S are damaged with the resultant decrease in quality. In addition, they also damage the work rolls. Furthermore with increase in degree of lapping the gap or clearance must be increased so that incomplete shearing tends to occur.

Recently there has been a trend toward increasing the thickness of hot strips from the prior art thickness of about 40 mm to 80 mm in order to save the energy by decreasing the heating temperature. As a result the degree of lapping and thus the gap or clearance must be increased so that the defects and damages caused by needle-shaped burrs and incomplete shearing tend to occur very frequently.

In view of the above one of the objects of the present invention is to provide a drum type flying shear which may ensure complete shearing and may completely eliminate the formation of needle-shaped burrs which cause the surface defects of hot strips, whereby the products with high qualities may be provided.

The present invention will become more apparent from the following description of one preferred embodiment thereof taken in conjunction with the accompanying drawings, in which.

Since the construction of both sides of the drum type flying shear of the present invention is substantially similar, only one side will be described in this specification unless otherwise stated.

Figure 1:
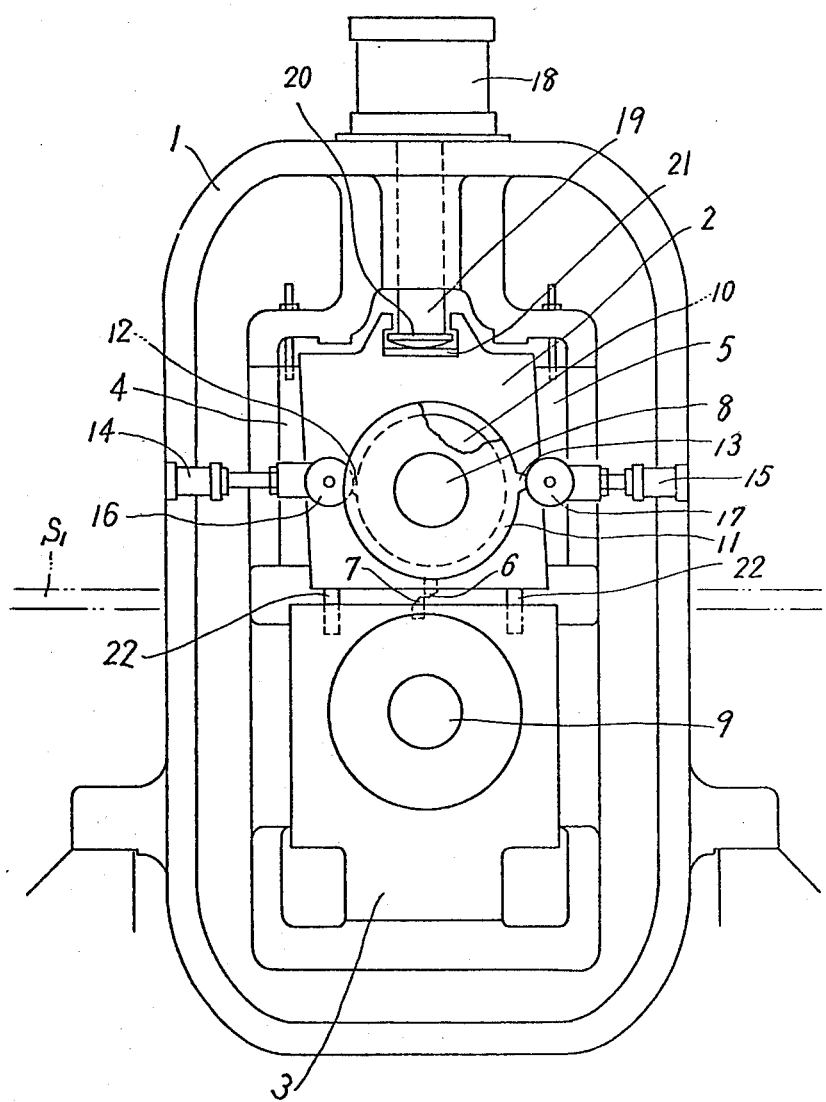
FIG. 1 is a side view of one preferred embodiment of a drum type flying shear in accordance with the present invention.

Referring to FIG. 1, the drum type flying shear of the present invention has a pair of housings or frames 1 spaced apart widthwise so that a hot strip $S_1$ may pass therebetween, and a lower bearing box 3 is mounted on the lower portion of the housing or frame 1 and rotatably supports the shaft of a lower drum 9 with a lower blade 7 with a bearing (not shown).

An upper bearing box 2 having a bearing (not shown) is slidably fitted between the inclined surfaces of wedges 4 and 5 attached to the upper portion of the housing or frame 1 in such a way that the upper bearing box 2 supporting an upper drum 8 with an upper blade 6 may be caused to move downward and then upward at an angle relative to the vertical as will be described in detail hereinafter.

Figure 2:
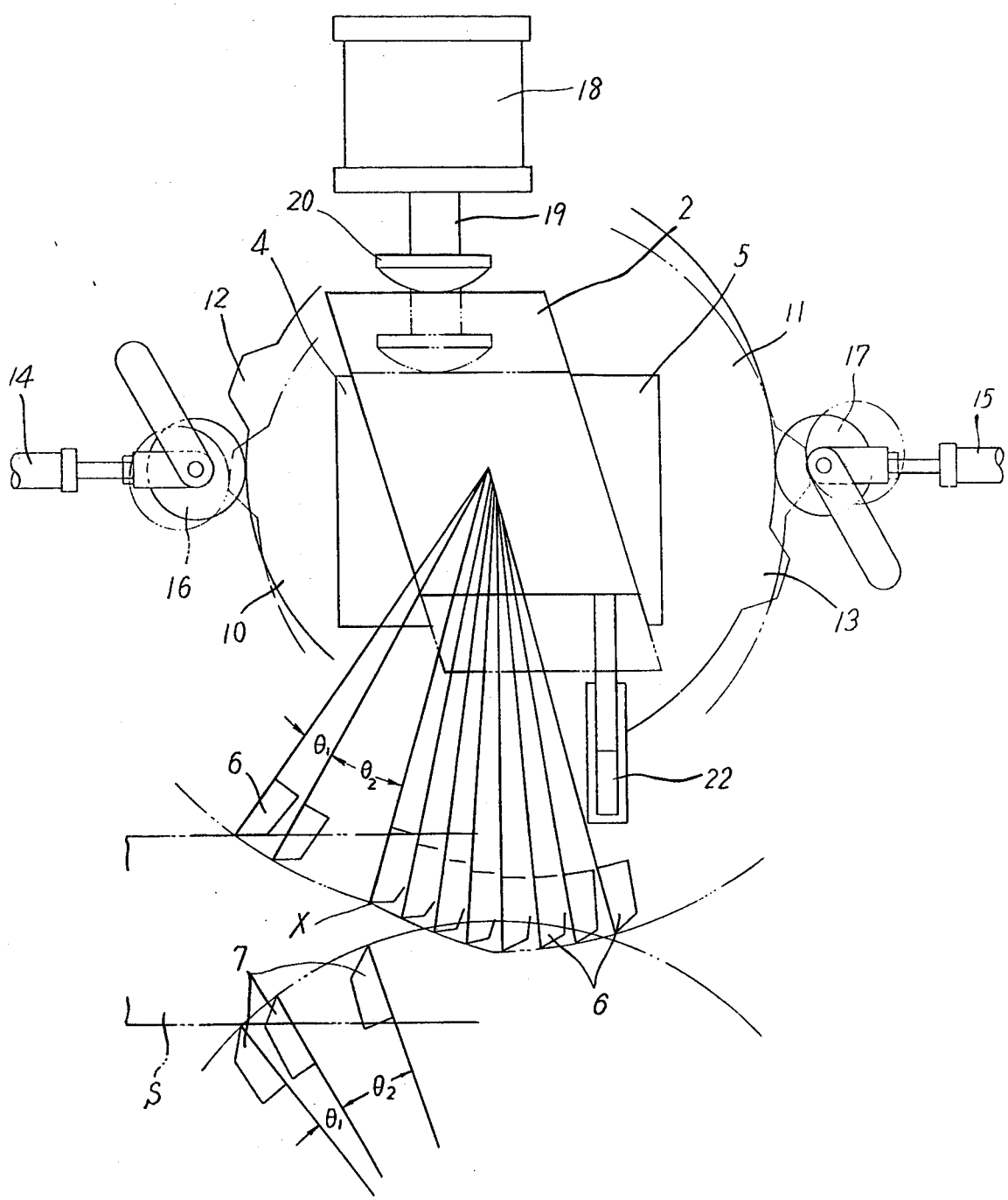
FIG. 2 is a fragmentary view, on enlarged scale, thereof used for the explanation of the mode of operation.

Referring also to FIG. 2, a small-diameter cam disk 10 with a projection 12 and a large-diameter cam disk 11 with a projection 13 angularly spaced apart from the projection of the small-diameter in such a way that the projections 12 and 13 are angularly spaced apart by 180°, cam disk 10 are carried by the shaft of the upper drum 8, and rollers 16 and 17 attached to the free ends of piston rods, respectively, of hydraulic cylinders 14 and 15 are made into rotatable engagement with the peripheries, respectively, of the small- and large-diameter cam disks 10 and 11 at a predetermined constant pressure. Both the hydraulic cylinders 14 and 15 are mounted on the housing or frame 1.

A driving cylinder 18 for driving the upper bearing box 2 which is mounted on the top of the frame 1 has a pressure cap 20 firmly attached to the free or lower end of a piston rod 19 and fitted into a groove formed at the top of the upper bearing box 2 and made into engagement with a pressure receiving plate 21 at the bottom of the groove. Balance cylinders 22 are mounted on the top of the lower bearing box 3 to support the upper bearing box 2 at a predetermined constant pressure.

Figure 3:
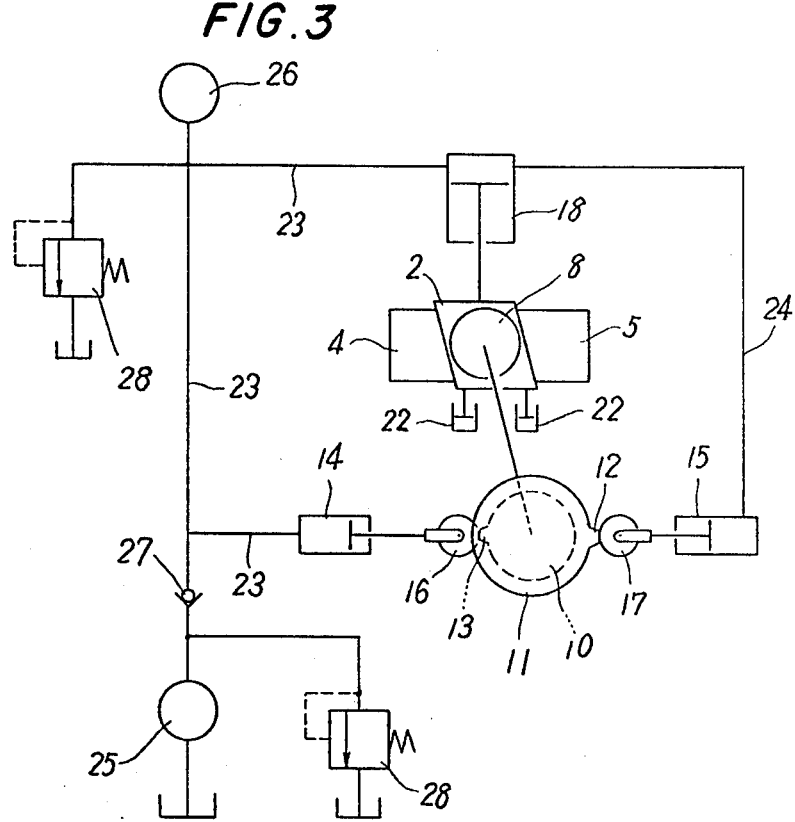
FIG. 3 is a diagram of a closed-loop hydraulic circuit thereof.

Referring further to FIG. 3, the hydraulic cylinders 14 and 15 and the driving cylinder 18 are hydraulically intercommunicated with each other through lines 23 and 24 to form a closed loop, and a hydraulic pump 25 and an accumulator 26 are inserted into the line 23 in order to supply the working oil to the closed loop when the pressure therein drops below a predetermined level. In addition, a nonreturn valve 27 is inserted in order to prevent the flow of the working oil from the closed loop to the hydraulic pump 25 and relief valves 28 are also inserted.

Referring back to FIG. 1, the upper and lower drums 8 and 9 are drivingly coupled through upper and lower spindles (not shown) to a driving device (not shown).

Figure 4:
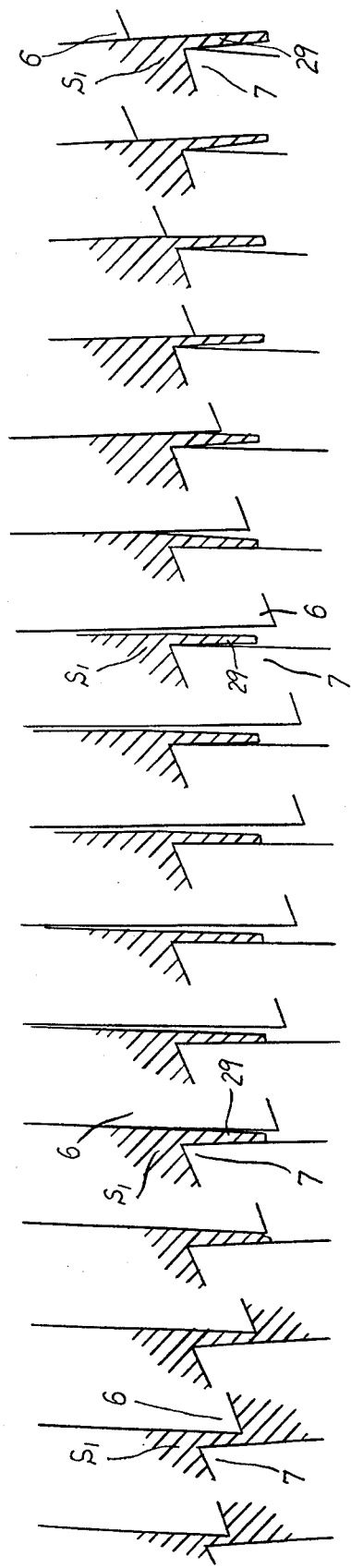
FIG. 4 shows the steps of shearing a hot strip with the drum type flying shear of the present invention.
Figure 5:
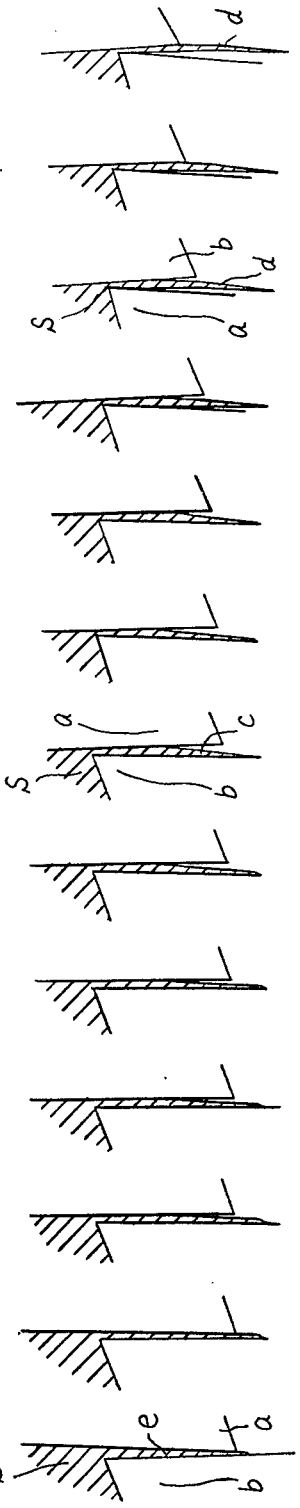
FIG. 5 shows the steps of shearing a hot strip with a prior art drum type flying shear.

Referring to FIG. 4, reference numeral 29 denotes a burr formed when the hot strip $S_1$ is sheared.

Next the mode of operation of the drum type flying shear with the above construction will be described. When the hot strip $S_1$ is fed into the flying shear and reaches a predetermined position, a sensor (not shown) outputs a signal in response to which the driving device (not shown) is energized to drive both the upper and lower drums 8 and 9. Upon rotation of the upper and lower drums 8 and 9 the upper and lower blades 6 and 7 initially describe circular paths or loci, respectively, starting the shearing of the hot strip $S_1$. Until the projections 12 and 13 of the small- and large-diameter cam disks 10 and 11 are made into engagement with the rollers 16 and 17 of the hydraulic cylinders 14 and 15, the rollers 16 and 17 are kept in contact with the peripheries of the cam disks 10 and 11 at a constant pressure so that the working oil in the closed loop remains stationary and consequently the upper bearing box 2 remains in the initial position while the upper drum 8 rotates.

The upper and lower blades 6 and 7 rotate through an angle $\theta_1$ and then an angle $\theta_2$, shearing the hot strip $S_1$ while describing a circular locus. When the cutting edge of the upper blade 6 reaches a point X (See FIG. 2), both the projections 12 and 13 of the small- and large-diameter cam disks 10 and 11 are made into engagement with the rollers 16 and 17, respectively, causing the piston rods of the hydraulic cylinders 14 and 15 to retract into the cylinders. As a consequence each of the cylinders 14 and 15 acts as a plunger pump so that the working oil in the closed loop is forced into the driving cylinder 18 so that its piston rod 19 is extended downwardly.

Upon extension of the piston rod 19 of the driving cylinder 18, the upper bearing box 2 is caused to slide along the inclined guide surfaces of the wedges 4 and 5 so that the upper blade 6 is lowered and moved away from the lower blade 7, describing a non-circular path or locus as best shown in FIG. 2, whereby the hot strip $S_1$ is completely sheared. When shearing is effected the working oil under pressure is forced to flow into the balance cylinders 22 so that the upper and lower bearing boxes 2 and 3 are pressed against each other at a constant pressure.

When complete shearing of the hot strip $S_1$ is effected, the projections 12 and 13 of the small-diameter and large-diameter cam disks 10 and 11 are gradually disengaged from the rollers 16 and 17, respectively, so that the pressure in the closed loop drops and is finally overcomed by the pressure in the balance cylinders 22. Then the upper bearing box 2 is forced to move upwardly along the inclined guide surfaces of the wedges 4 and 5 while the piston rod 19 of the driving cylinder 18 is retracted.

As the piston rod 19 of the driving cylinder 18 is retracted the working oil in the cylinder 18 is forced to flow into the hydraulic cylinders 14 and 15, causing their piston rods extended so that the rollers 16 and 17 may be always made into contact with the peripheries of the cam disks 10 and 11. The upper bearing box 2 is returned to its initial position and is ready for the next shearing. After the projections 12 and 13 have been disengaged from the rollers 16 and 17, respectively the upper blade 6 describes a circular locus again. Since thne movement of the upper blade is controlled by the closed loop hydraulic circuit in the manner described above, the deviation of the timing when the upper blade 6 starts describing a non-circular locus will not occur.

When the hot strip $S_1$ is sheared in the manner described above, the burr 29 is formed as shown in FIG. 4, but in the process of shearing the upper bearing box 2 is caused to move in the same direction as the hot strip $S_1$ while being lowered as best shown in FIG. 2 so that the gap or clearance between the upper and lower blades 6 and 7 may be prevented from being excessively narrowed and consequently the ironing or re-rolling of the burr 29 may be prevented. As a result, opposed to the prior art drum type flying shears no needle-shaped burrs are formed (See FIG. 4).

So far the upper blade 6 has been described as describing a non-circular path, but it is to be understood that the lower blade or both the upper and lower blades may be so arranged as to describe a non-circular path when shearing is effected. Furthermore each of the upper and lower drums may carry two blades while the cam disks 10 and 11 may have two projections. Instead of the small- and large-diameter cam disks 10 and 11, the cam disks having the same diameter may be used. Instead of two hydraulic cylinders 14 and 15, only one hydraulic cylinder may be used when it has a sufficiently large capacity. And further various modifications may be effected as needs demand.

The novel features, effects and advantages of the present invention may be summarized as follows:

I. Since the blade is so arranged as to described a non-circular path when shearing is effected, the degree of lapping may be increased considerably as compared with the prior art drum type flying shears so that complete shearing may be ensured.

II. Upon shearing the rate at which the upper blade is moved away from the lower blade is faster when the former describes a non-circular locus than when it describes a circular locus so that the force which causes the separation of a crop from a hot strip is by far greater as compared with the prior art drum type flying shears of the type describing a circuit locus. As a consequence the fracture or rupture step may be much facilitated.

III. The clearance between the upper and lower blades may be prevented from being excessively reduced so that no needle-shaped burr is formed. Therefore the qualitites of hot strips rolled by a finishing rolling mill are not degraded, and the damages to work rolls may be also prevented.

IV. The cam disks are used to control the timing at which the driving cylinder 18 extends or retracts its piston rod 19 and the extension and retraction or withdrawal of the piston rod are effected by the closed-loop hydraulic circuit so that the deviation in timing will not occur.

What is claimed is:

1. A drum type flying shear comprising a housing, an upper bearing box supporting an upper drum having an upper blade and a lower bearing box supporting a lower drum having a lower blade, said bearing boxes are mounted said housing, guide means in said housing, at least one of said bearing boxes being fitted between guide means in such a way that, it is slidable downwardly and upwardly at an angle to the vertical, driving cylinder means is provided for said guided bearing box for said slidable movement thereof, cam means are attached to the shaft of the drum carried by said guided bearing box, an hydraulic cylinder means having a piston rod cam follower means in the form of a roller is attached to the free end of said piston rod and is in engagement with the periphery of each of said cam means, said driving hydraulic cylinder means and said hydraulic cylinder means are hydraulically intercommunicated with each other to establish a closed-loop hydraulic circuit, and balancing means is provided for pressing against the movement of said guided bearing box by the driving hydraulic cylinder.

2. A drum type flying shear as set forth in claim 1 wherein said cam means consist of a large-diameter cam disk and a small-diameter cam disk each having a projection extended from the periphery thereof, the projections being angularly spaced apart from each other by 180°.

* * * * *